(12) United States Patent
Zha (10) Patent No.: US 12,135,848 B2
(45) Date of Patent: Nov. 5, 2024

(54) MINI LED TOUCH PANEL AND ITS DRIVING METHOD AND PREPARATION METHOD

(71) Applicant: Shenzhen China Star Optoelectronics Semiconductor Display Technology Co., Ltd., Guangdong (CN)

(72) Inventor: Bao Zha, Guangdong (CN)

(73) Assignee: Shenzhen China Star Optoelectronics Semiconductor Display Technology Co., Ltd., Shenzhen (CN)

( * ) Notice: Subject to any disclaimer, the term of this patent is extended or adjusted under 35 U.S.C. 154(b) by 0 days.

(21) Appl. No.: 17/623,312

(22) PCT Filed: Dec. 22, 2021

(86) PCT No.: PCT/CN2021/140592
§ 371 (c)(1),
(2) Date: Dec. 28, 2021

(87) PCT Pub. No.: WO2023/108768
PCT Pub. Date: Jun. 22, 2023

(65) Prior Publication Data
US 2024/0069666 A1    Feb. 29, 2024

(30) Foreign Application Priority Data
Dec. 16, 2021    (CN) .......................... 202111545171.9

(51) Int. Cl.
*G06F 3/041*    (2006.01)
*G09G 3/32*    (2016.01)

(52) U.S. Cl.
CPC ...... *G06F 3/04164* (2019.05); *G06F 3/04166* (2019.05); *G09G 3/32* (2013.01); *G06F 2203/04103* (2013.01)

(58) Field of Classification Search
CPC ............................ G06F 3/0412; G06F 3/0433
See application file for complete search history.

(56) References Cited

U.S. PATENT DOCUMENTS

| | | | |
|---|---|---|---|
| 2016/0103544 A1* | 4/2016 | Filiz ...................... | G06F 3/0412 345/174 |
| 2016/0282990 A1 | 9/2016 | Kimura et al. | |
| 2021/0200354 A1* | 7/2021 | Kang .................... | G06F 3/0412 |

FOREIGN PATENT DOCUMENTS

| | | |
|---|---|---|
| CN | 101825788 | 9/2010 |
| CN | 103676280 | 3/2014 |
| CN | 106292022 | 1/2017 |
| CN | 108493154 | 9/2018 |
| CN | 109388273 | 2/2019 |
| CN | 109491543 | 3/2019 |
| CN | 110162224 | 8/2019 |
| CN | 112967619 | 6/2021 |
| JP | 2015-210696 | 11/2015 |

* cited by examiner

Primary Examiner — Kevin M Nguyen (57) ABSTRACT

The present disclosure provides a light-emitting diode (LED) touch panel and its driving method and preparation method. Under switching transistors of touch units controlled by touch addressing lines, electric charges accumulated in a touch conductive layer are extracted into a touch reading line to determine touch-point coordinates, thereby embedding the touch units into sub-pixels of the mini LED touch panel to form a mini LED-based embedded touch panel.

8 Claims, 5 Drawing Sheets

MINI LED TOUCH PANEL AND ITS DRIVING METHOD AND PREPARATION METHOD

RELATED APPLICATIONS

This application is a National Phase of PCT Patent Application No. PCT/CN2021/140592 having International filing date of Dec. 22, 2021, which claims the benefit of priority of Chinese Patent Application No. 202111545171.9 filed on Dec. 16, 2021. The contents of the above applications are all incorporated by reference as if fully set forth herein in their entirety.

FIELD AND BACKGROUND OF INVENTION

The present disclosure relates to the technical field of display, and specifically to a mini LED touch panel and its driving method and preparation method.

Projected capacitive touch display screens are divided into self-capacitance touch screens and mutual-capacitance touch screens. Compared with the mutual-capacitance touch screen, the self-capacitance touch screen has much lower difficulty in terms of conductive layer planning, wiring, or algorithm, so that the self-capacitance touch screen still has its own advantages. In order to prevent ghost points and realize multi-points touch, the self-capacitance touch panel adopts a driving method in which each touch electrode has a separate lead. However, this driving method has too many leads, a complex structure, and an increase in cost. At present, there have studies on applying active-matrix touch (AM touch) scanning technology to self-capacitance touch panels. Each touch electrode is connected to a source of a switching TFT, a gate of the switching TFT is led out in a connection of a turn-on signal in an X-axis (a horizontal axis), a drain of the switching TFT is led out in a connection of a reading signal in a Y-axis (a vertical axis), and then the touch electrodes are turned on row by row and one by one by the turn-on signal, and then capacitance change of each touch electrode is read by the reading signal, thereby determining touching-point coordinates.

SUMMARY OF THE INVENTION

Development of mini LED display panels is an emerging direction in the future. However, due to the insufficient production capacity of mini LED display panels and each small display area of the mini LED, there is a fewer mini LED touch panels. Even if there are mini LED touch panels, a plug-in connection method is generally used, that is, touch sensors are disposed outside the display panel, so that integration and combination of the mini LED touch panel is poor, resulting in insufficient touch interaction.

To solve the above problems, an embodiment of the present disclosure applies active-matrix touch scanning technology to mini light-emitting diode (LED) and provides a mini LED touch panel and its driving method and preparation method, so as to realize a mini LED-based embedded touch panel.

In the first aspect, an embodiment of the present disclosure provides a mini light-emitting diode (LED) touch panel, including: a plurality of touch units distributed in an array manner, a plurality of touch addressing lines arranged in a first direction, and a plurality of touch reading lines arranged in a second direction, wherein the first direction and the second direction are perpendicular to each other;

Each of the touch units includes a switching transistor and a touch conductive layer, and the touch conductive layer is distributed within gaps between a plurality of corresponding sub-pixels and extends into the corresponding sub-pixels; wherein a gate of the switching transistor is connected to a respective one of the touch addressing lines, a source of the switching transistor is connected to the touch conductive layer, and a drain of the switching transistor is connected to a respective one of the touch reading lines; and Each of the sub-pixels includes a driving transistor and a mini LED lamp bead connected to each other, and the driving transistor of the sub-pixel is connected to the mini LED lamp bead via the touch conductive layer.

In some embodiments, the mini LED touch panel further includes a plurality of scan lines arranged in the first direction, and a plurality of data lines arranged in the second direction; wherein a gate of the driving transistor is connected to one of the scan lines, a source of the driving transistor is connected to one of the data lines, and a drain of the driving transistor is connected to the mini LED lamp bead via the touch conductive layer.

In some embodiments, the touch conductive layer is a self-capacitance conductive layer, and the touch conductive layer is grounded.

In some embodiments, the mini LED touch panel further includes a touch-point coordinates acquisition unit, wherein the touch-point coordinates acquisition unit is connected to one of the touch reading lines, and the touch-point coordinates acquisition unit is configured to amplify and read electric charges accumulated in the touch conductive layer and to determine touching-point coordinates according to a variation in the electric charges.

In a second aspect, an embodiment of the present disclosure provides a driving method for a mini light-emitting diode (LED) touch panel, used for the mini LED touch panel mentioned above, wherein the driving method includes steps:

During displaying an image, turning on the driving transistor of each of the sub-pixels via one of the scan lines, and inputting a data signal to the mini LED lamp bead via one of the data lines;

During touch scanning, turning on the switching transistor of each of the touch units via one of the touch addressing lines, and transferring electric charges accumulated in the touch conductive layer via one of the touch reading lines.

In some embodiments, after transferring the electric charges accumulated in the touch conductive layer via one of the touch reading lines, the driving method further includes:

In some embodiments, amplifying and reading, by a touch-point coordinates acquisition unit, the electric charges accumulated on the touch conductive layer, and determining touching-point coordinates according to a variation in the electric charges.

In some embodiments, an image display stage and a touch scan stage are performed in a time-sharing manner in time of each frame.

In some embodiments, the touch conductive layer is a self-capacitance conductive layer, and the touch conductive layer is grounded.

In a third aspect, an embodiment of the present disclosure also provides a preparation method for a mini light-emitting diode (LED) touch panel, used for the mini LED touch panel mentioned above, wherein the preparation method includes steps:

S1: synchronously preparing switching transistors of touch units and driving transistors of the sub-pixels;

S2: preparing, a touch conductive layer of each of the touch units, between a plurality of sub-pixels correspondingly sensed by each of the touch units and in each of the sub-pixels.

S3: disposing a mini LED lamp bead on the touch conductive layer extending into each of the sub-pixels.

In some embodiments, step S1 specifically includes:

Synchronously preparing a light-shielding layer within each of the touch units and a light-shielding layer within each of the sub-pixels on a glass substrate;

Preparing a first passivation layer within each of the touch units on the light-shielding layer within each of the touch units, and synchronously preparing a first passivation layer within each of the sub-pixels on the light-shielding layer within each of the sub-pixels;

Preparing an active layer within each of the touch units on the first passivation layer within each of the touch units, and synchronously preparing an active layer within each of the sub-pixels on the first passivation layer within each of the sub-pixels;

Preparing a gate insulation layer and a second passivation layer within each of the touch units over the active layer within each of the touch units, and synchronously preparing a gate insulation layer and a second passivation layer within each of the sub-pixels over the active layer within each of the sub-pixels;

Etching a gate layer and a source and drain layer within each of the touch units on the second passivation layer within each of the touch units, and synchronously preparing a gate layer and a source and drain layer within each of the sub-pixels on the second passivation layer within each of the sub-pixels.

In some embodiments, step S2 specifically includes:

Preparing a third passivation layer within each of the touch units on the second passivation layer and the source and drain layer within each of the touch units, and synchronously preparing a third passivation layer within each of the sub-pixels on the second passivation layer and the source and drain layer within each of the sub-pixels;

Synchronously preparing the touch conductive layer on the third passivation layer within each of the touch units and on the third passivation layer within each of the sub-pixels;

Preparing a black matrix layer within each of the touch units on the touch conductive layer within each of the touch units, and synchronously preparing a black matrix layer within each of the sub-pixels on the touch conductive layer within each of the sub-pixels.

In some embodiments, step S3 specifically includes:

Disposing a mini LED lamp bead on the touch conductive layer within each of the sub-pixels, and connecting the mini LED lamp bead to the touch conductive layer within each of the sub-pixels.

In some embodiments, the touch conductive layer is a self-capacitance conductive layer, and the touch conductive layer is grounded.

In some embodiments, the touch conductive layer and a pixel definition layer or wiring layer of each of the sub-pixels are arranged in the same layer.

In some embodiments, the touch conductive layer extending into each of the sub-pixels is configured as a pixel definition layer or wiring layer of each of the sub-pixels.

In the mini LED touch panel and its driving method and manufacturing method provided by embodiments of the present disclosure, each touch unit correspondingly senses a capacitance change in a range of a plurality of sub-pixels. Specifically, the touch conductive layer is distributed within gaps between a plurality of corresponding sub-pixels and extends into the corresponding sub-pixels, wherein each of the sub-pixels includes a driving transistor and a mini LED lamp bead connected to each other, and the driving transistor of the sub-pixel is connected to the mini LED lamp bead via the touch conductive layer. Meanwhile, the source of the switching transistor of each of the touch units is connected to the touch conductive layer, the gate electrode is connected to a respective one of the touch addressing lines, and the drain is connected to a respective one of the touch reading. Under the switching transistor controlled by the touch addressing line, the electric charges accumulated in the touch conductive layer are extracted into the touch reading line, thereby adopting an active active-addressing-scan method, touching-point coordinates can be determined according to the capacitance change in a range of the sub-pixels corresponding to each touch unit. The switching transistors of the touch units and the driving transistors of the sub-pixels are made by the same manufacturing process, and there is no need to add a new process, so the touch units are embedded in the sub-pixels of a mini LED touch panel with the least process, a mini LED-based embedded touch panel is formed, which improves integration and combination of the mini LED touch panel.

DESCRIPTION OF SPECIFIC EMBODIMENTS OF THE INVENTION

In order to make the purpose, technical solutions, and effects of the present disclosure clearer and clearer, the following further describes this application in detail with reference to the accompanying drawings and examples. It should be understood that the specific embodiments described here are only used to explain the present disclosure, and are not used to limit the present disclosure.

Figure 1:
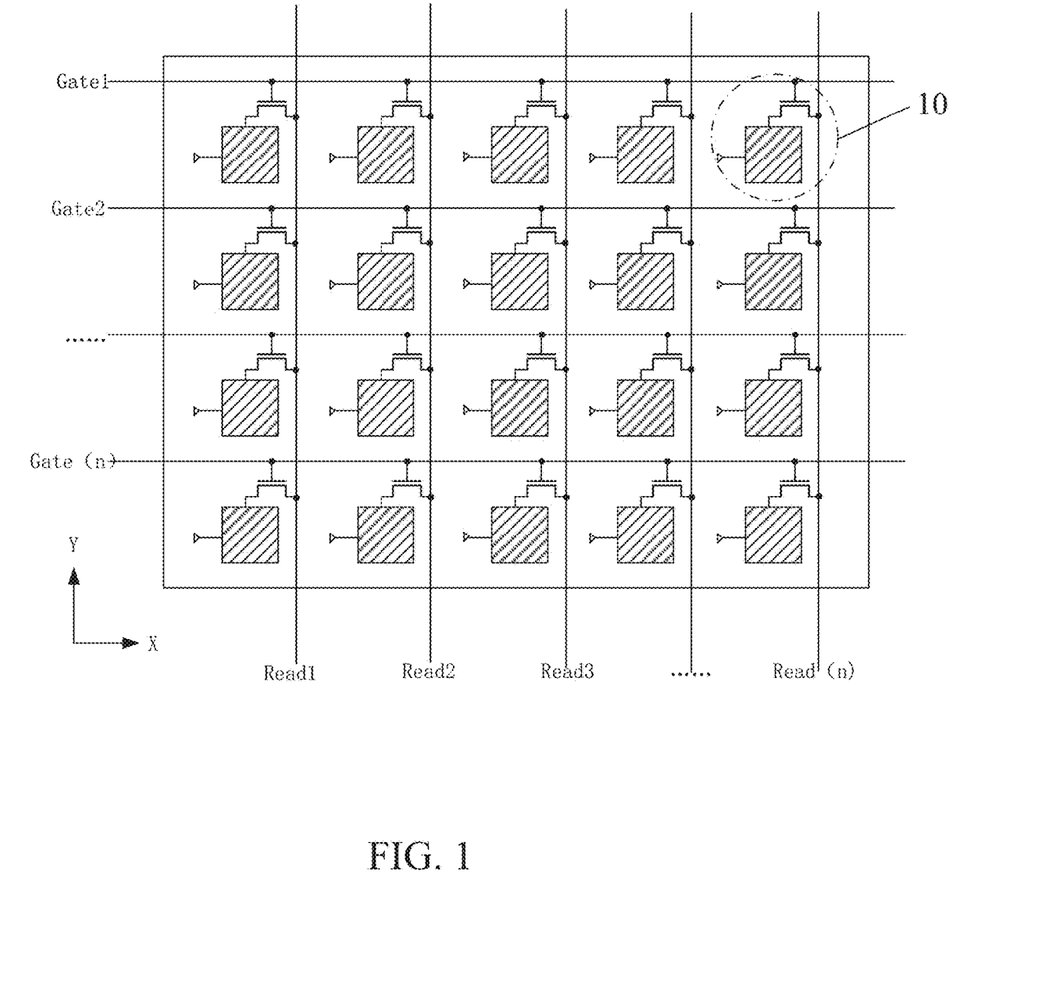
FIG. 1 is a schematic diagram of overall structure of a mini LED touch panel provided by an embodiment of the present disclosure.
Figure 2:
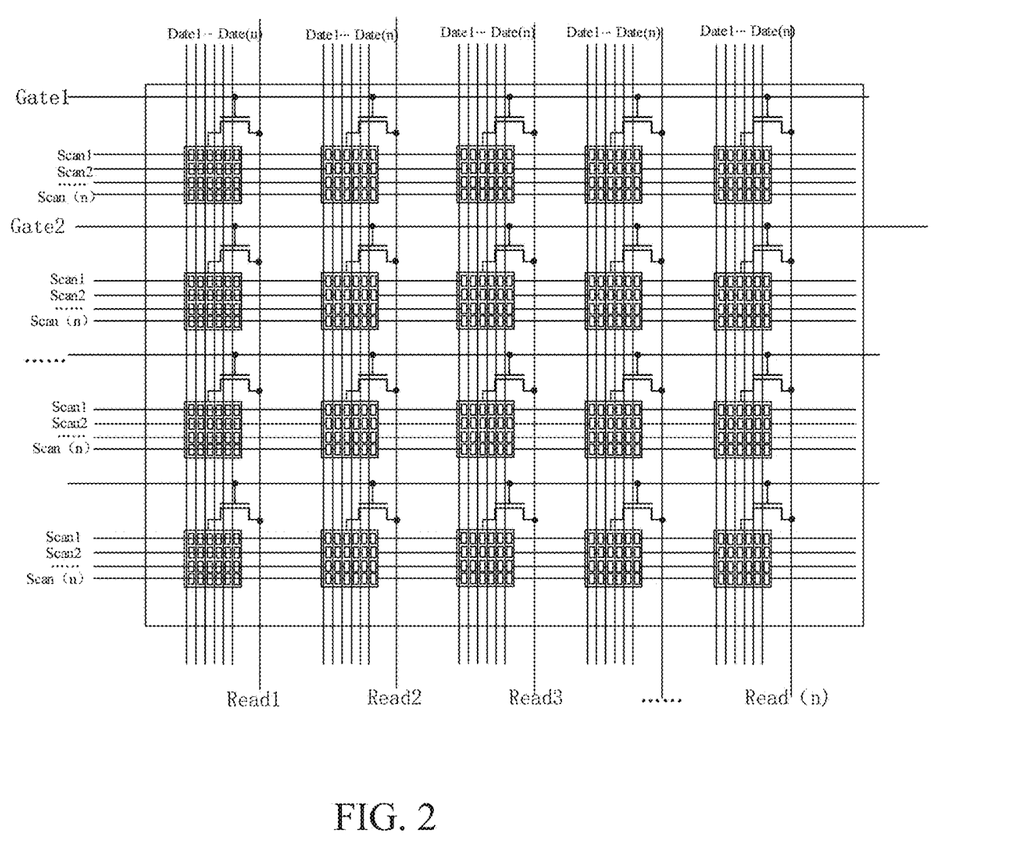
FIG. 2 is a schematic diagram of a specific structure of a mini LED touch panel provided by an embodiment of the present disclosure.
Figure 3:
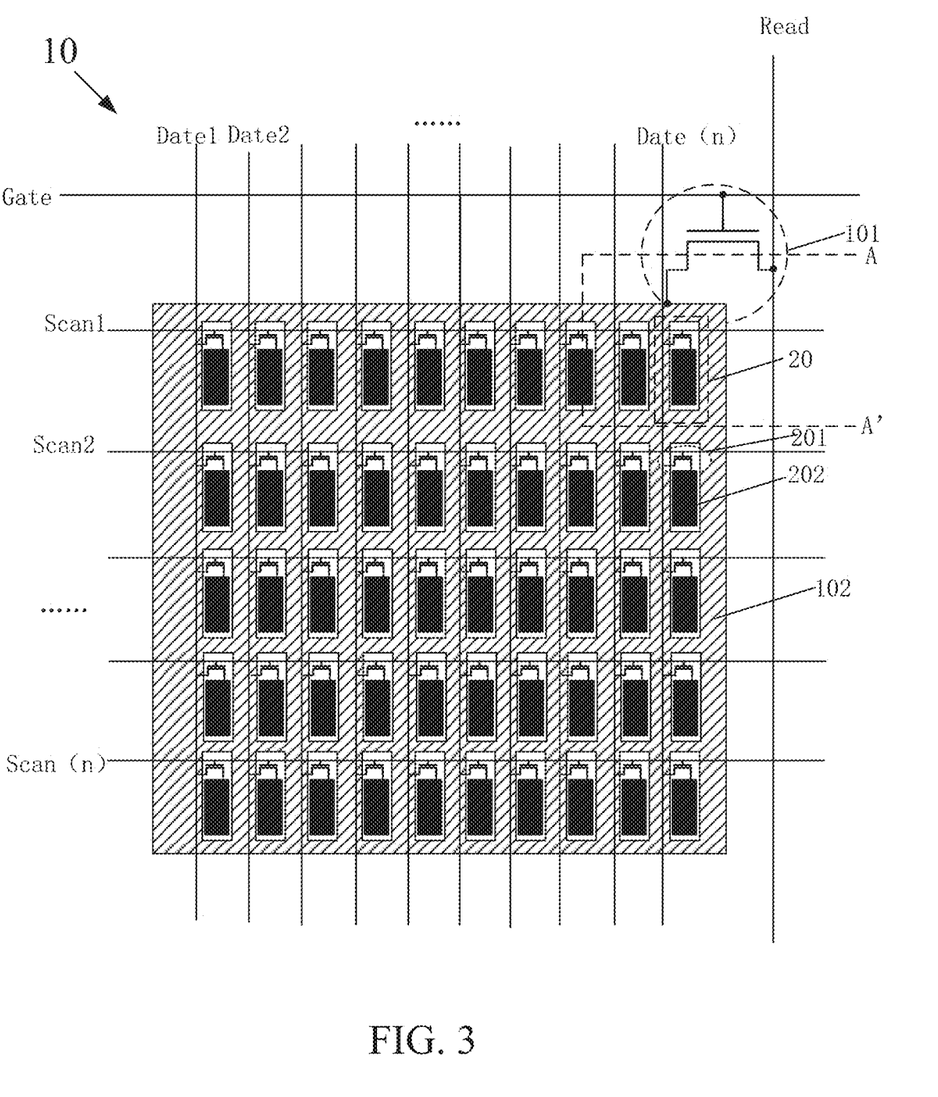
FIG. 3 is a schematic detail diagram of touch units of a mini LED touch panel provided by an embodiment of the present disclosure.

FIG. 1 is a schematic diagram of overall structure of a mini LED touch panel provided by an embodiment of the present disclosure, FIG. 2 is a schematic diagram of a specific structure of a mini LED touch panel provided by an embodiment of the present disclosure, and FIG. 3 is a schematic detail diagram of touch units of a mini LED touch panel provided by an embodiment of the present disclosure. FIG. 3 is a schematic structural diagram of any one of touch units 10 shown in FIG. 1 or FIG. 2.

As shown in FIGS. 1, 2, and 3, an embodiment of the present disclosure provides a mini LED touch panel, including a plurality of touch units 10 distributed in an array manner, a plurality of touch addressing lines arranged in a first direction X, and a plurality of touch reading lines arranged in a second direction Y, wherein the first direction X and the second direction Y are perpendicular to each other, e.g., the first direction X is a direction in a row and the second direction Y is a direction in a column. Each of the touch units 10 is used to correspondingly sense a capacitance change within a range of a plurality of sub-pixels 20 distributed in an array manner, and the sub-pixels 20 in each row or column are distributed periodically, such as red sub-pixels 20, blue sub-pixels 20, and green sub-pixels 20 being periodically arranged.

Each of the touch units 10 includes a switching transistor 101 and a touch conductive layer 102 (generally made of indium tin oxide (ITO) material). The touch conductive layer 102 is distributed within gaps between a plurality of corresponding sub-pixels 20 and extends into the corresponding sub-pixels 20; wherein a source of the switching transistor 101 is connected to the touch conductive layer 102, a gate of the switching transistor 101 is connected to a respective one of the touch addressing lines Gate, and a drain of the switching transistor 101 is connected to a respective one of the touch reading lines Read. It is understandable that an area of each of touch units 10 should be smaller than an area of a finger, so that when the finger touches, touch-point coordinates can be accurately determined by the touch units 10, e.g., if each touch-point unit is square, then a feature regarding a length and a width of each touch unit 10 is generally less than 7 mm*7 mm. Each sub-pixel 20 includes a driving transistor 201 and a mini LED lamp bead 202 connected to each other, and the driving transistor is connected to the mini LED lamp bead 202 via the touch conductive layer 102.

Specifically, the self-capacitance touch panel includes a plurality of touch units 10 distributed in an array manner, and each touch unit 10 has a touch conductive layer 102 that is distributed within gaps between a plurality of corresponding sub-pixels 20 distributed in an array manner for correspondingly sensing and extends into the corresponding sub-pixels 20. By disposing switching transistors 101 connected to the touch conductive layer 102 and connected to the touch addressing lines Gate and the touch reading lines Read, the touch units 10 are connected to the outside. Each of the touch addressing lines Gate is connected to the gate of one of the switching transistors 101. The touch conductive layer 102 is connected to the source of each of the switching transistors 101. Each of the touch reading lines Read is connected to the drain of one of the switching transistors 101. Therefore, based on the switching transistors 101, under the control of the touch addressing lines Gate, the electric charges accumulated in the touch conductive layer 102 can be extracted via the touch reading lines Read. According to a variation of the electric charges accumulated in the touch conductive layer 102, a capacitance change in the corresponding sub-pixels 20 can be sensed to determine whether a touch point is in the touch unit 10 according to the capacitance change in the sub-pixels 20 corresponding to each touch unit 10.

Further, each sub-pixel 20 includes a driving transistor 201 and a mini LED lamp bead 202 connected to each other. The driving transistor 201 and the mini LED lamp bead 202 are connected via the touch conductive layer 102. The driving transistor 201 is used to drive the mini LED lamp bead 202 to be lit up.

In the mini LED touch panel provided in this embodiment, each touch unit 10 correspondingly senses a change in capacitance within a range of a plurality of sub-pixels 20. Specifically, the touch conductive layer 102 of each of the touch units 10 is distributed within gaps between a plurality of corresponding sub-pixels and extends into the corresponding sub-pixels 20. Each sub-pixel 20 includes a driving transistor 201 and a mini LED lamp bead connected to each other. The driving transistor 201 is connected to the mini LED lamp bead via the touch conductive layer 102. Meanwhile, the source of the switching transistor 101 of the touch unit 10 is connected to the touch conductive layer 102, the gate is connected to a respective touch addressing line Gate, and the drain is connected to a respective touch reading line Read, thereby adopting an active active-addressing-scan method, touching-point coordinates can be determined according to the capacitance change in a range of the sub-pixels 20 corresponding to each touch unit 10. The touch units are embedded in the sub-pixels of a mini LED touch panel, a mini LED-based embedded touch panel is formed, which improves integration and combination of the mini LED touch panel.

It should be noted that the mutual-capacitance touch panel at least requires two electrodes that are a sending electrode and a receiving electrode, while the self-capacitance panel basically only needs a self-capacitance electrode. When an active active-addressing-scan method is used to scan the touch units 10, after each of the touch addressing lines turns on the touch units 10 row by row, each of the touch reading lines collect capacitance change values in a range of the plurality of the sub-pixels 20 corresponding to the touch units 10 column by column. When a finger touches the touch panel, the capacitance change value in the range of the plurality of sub-pixels 20 causes the electric charges accumulated in the touch conductive layer 102 to change, therefore, one of the touch units 10 where the touch operation occurs and coordinates of the touch point can be determined according to the variation in the electric charges accumulated by the touch conductive layer 102. In the above-mentioned addressing process, each of the touch units 10 has the same function and is used to sense the capacitance change in the corresponding sub-pixels 20. Therefore, the active active-addressing-scan method is generally used in self-capacitance touch panels. Namely, the touch conductive layer 102 of the mini LED touch panel is a self-capacitance conductive layer, and the touch conductive layer 102 is grounded. The touch operation of each corresponding touch unit 10 is determined according to the touch conductive layer 102 of each touch unit 10, thereby determining a touch coordinate point. It is understandable that the active active-addressing-scan method has the advantages such as no ghost points, realizing multi-touch, and simple in-plane leads (wiring).

It can be understood that the mini LED touch panel further includes the plurality of scan lines Scan arranged in the first direction X and the plurality of data lines Data arranged in the second direction Y, the driving transistor 201 of each of the sub-pixels 20 is connected to one of the scan lines Scan, the source of each of the sub-pixels 20 is connected to one of the data line Data, and the drain of each of the sub-pixel 20 is connected to the mini LED lamp bead 202 via an ITO electrode layer. Therefore, under the control of the scan line Scan, the driving transistor 201 drives the mini LED lamp bead 202 to be lit and work according to a data signal.

Further, the mini LED touch panel also includes a touch-point coordinates acquisition unit (not shown in the figure), and the touch-point coordinates acquisition unit uses an integrator to amplify and read the electric charges accumulated in the conductive layer 102 and extracted via one of the touch reading lines, thereby preparing for positioning the touch coordinate point.

It should be noted that the mini LED touch panel uses a time-sharing driving method to control screen display and touch sensing. Namely, within one frame, a part of time is used for display driving, and the other part of time is used for touch sensing.

Based on this, an embodiment of the present disclosure also provides a driving method for a mini LED touch panel, including:

During displaying an image, turning on the driving transistor 201 of each of sub-pixels 20 via one of the scan lines Scan, and inputting a data signal to the mini LED lamp bead via one of the data lines Data;

During touch scanning, turning on the switching transistor 101 of each of touch units via one of the touch addressing lines Gate, and transferring electric charges accumulated in the touch conductive layer 102 via one of the touch reading lines Read.

Further, during the touch scanning, the method further includes: amplifying and reading the electric charges accumulated on the touch conductive layer 102, and determining coordinates of a touching point according to a variation in the electric charges accumulated on the touch conductive layer 102.

It should be noted that the touch conductive layer 102 of each of the touch units 10 extends into a plurality of sub-pixels 20 correspondingly for sensing, and by the extended touch conductive layer 102 and the mini LED lamp bead 202, the driving transistor 201 of each of the sub-pixels 20 can drive the mini LED lamp bead 202 to be lit for work. The touch conductive layer 102 can be used as a pixel definition layer or a wiring layer of the sub-pixel 20. Namely, the touch conductive layer 102 extending into the sub-pixel 20 can be the pixel definition layer or the wiring layer of the sub-pixel 20. In other words, the touch conductive layer 102 of the touch unit 10 can be arranged in the same layer as the pixel definition layer or wiring layer of the sub-pixel 20. In this way, the touch conductive layer 102 of the touch unit 10 and the pixel definition layer or the wiring layer of the sub-pixel 20 may be manufactured in the same process. The manufacturing process is further reduced, so that the touch units 10 and the sub-pixels 20 can be further manufactured by basically the same manufacturing process.

Figure 4:
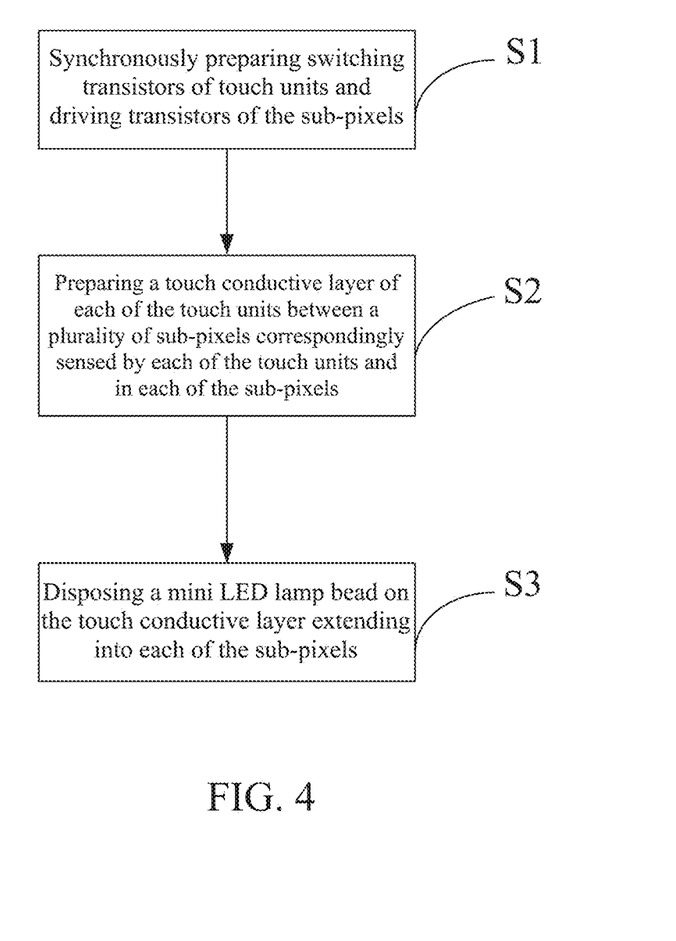
FIG. 4 is a schematic flow chart of a preparation method of a mini LED touch panel provided by an embodiment of the present disclosure.

Based on this, as shown in FIG. 4, an embodiment of the present disclosure also provides a preparation method for a mini LED touch panel, including the following steps:

S1: synchronously preparing switching transistors of touch units and driving transistors of the sub-pixels;

S2: preparing, a touch conductive layer of each of the touch units, between a plurality of sub-pixels correspondingly sensed by each of the touch units and in each of the sub-pixels;

S3: disposing a mini LED lamp bead on the touch conductive layer extending into each of the sub-pixels.

In the preparation method for the mini LED touch panel provided in this embodiment, the switching transistors 101 of the touch units 10 and the driving transistors 201 of the sub-pixels 20 are manufactured by the same manufacturing process, and there is no need to add a new manufacturing process, so the touch units 10 manufactured by adopting the least manufacturing process are embedded in the sub-pixels 20 of the mini LED touch panel to form a mini LED-based embedded touch panel, which improves integration and combination of the mini LED touch panel.

Figure 5:
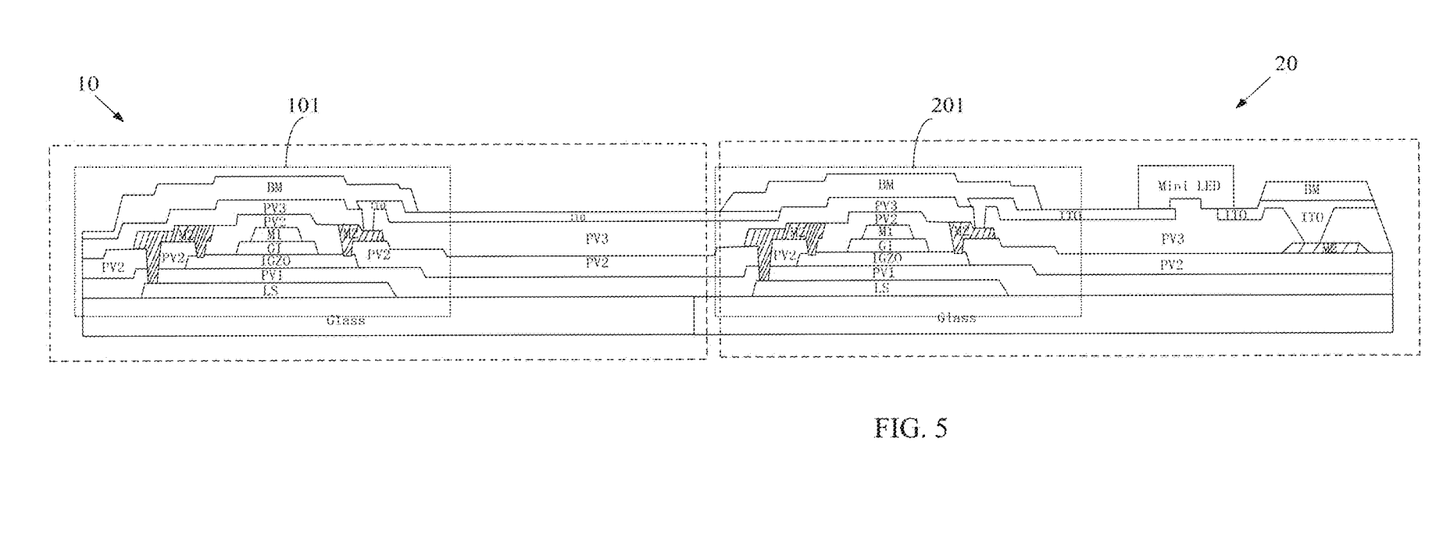
FIG. 5 is a schematic cross-sectional view of one touch unit of a mini LED touch panel provided by an embodiment of the present disclosure.

Based on the above embodiment, FIG. 5 is a schematic cross-sectional view of anyone touch unit 10 of a mini LED touch panel provided by an embodiment of the present disclosure. Namely, at an A-A' cross-section in FIG. 3, only one of sub-pixels is shown in FIG. 5, one of the touch units actually senses a plurality of sub-pixels. Taking a top-gated structure adopted in both the switching transistor 101 and the driving transistor 201 as an example (actually, it can also be a bottom-gated structure, an etch-stop-layer (ESL) structure or a back-channel-etch (BCE) structure, etc.), as shown in FIGS. 3 and 5, the specific process of each step of the preparation method is described.

Step S1 specifically includes:

Synchronously preparing a light-shielding layer within each of the touch units and a light-shielding layer within each of the sub-pixels on a glass substrate;

Preparing a first passivation layer within each of the touch units on the light-shielding layer within each of the touch units, and synchronously preparing a first passivation layer within each of the sub-pixels on the light-shielding layer within each of the sub-pixels;

Preparing an active layer within each of the touch units on the first passivation layer within each of the touch units, and synchronously preparing an active layer within each of the sub-pixels on the first passivation layer within each of the sub-pixels;

Preparing a gate insulation layer and a second passivation layer within each of the touch units over the active layer within each of the touch units, and synchronously preparing a gate insulation layer and a second passivation layer within each of the sub-pixels over the active layer within each of the sub-pixels;

Etching a gate layer and a source and drain layer within each of the touch units on the second passivation layer within each of the touch units, and synchronously preparing a gate layer and a source and drain layer within each of the sub-pixels on the second passivation layer within each of the sub-pixels.

Step S2 specifically includes:

Preparing a third passivation layer within each of the touch units on the second passivation layer and the source and drain layer within each of the touch units, and synchronously preparing a third passivation layer within each of the sub-pixels on the second passivation layer and the source and drain layer within each of the sub-pixels;

Synchronously preparing the touch conductive layer on the third passivation layer within each of the touch units and on the third passivation layer within each of the sub-pixels;

Preparing a black matrix layer within each of the touch units on the touch conductive layer within each of the touch units, and synchronously preparing a black matrix layer within each of the sub-pixels on the touch conductive layer within each of the sub-pixels.

Step S3 specifically includes:

Disposing a mini LED lamp bead on the touch conductive layer within each of the sub-pixels, and connecting the mini LED lamp bead to the touch conductive layer within each of the sub-pixels.

It should be noted that, in the touch unit 10, the source or drain of the switching transistor 101 and the driving transistor 201 are connected to the light-shielding layer LS, and free electric charges can be blocked in the light-shielding layer LS to prevent the free electric charges from affecting a threshold voltage of the switching transistor 101, causing the threshold voltage of the switching transistor 101 to drift.

After the above-mentioned specific preparation steps, a film structure shown in FIG. 5 is formed, so that the switching transistors 101 of the touch units 10 and the driving transistors 201 of the sub-pixels 20 are manufactured by the same manufacturing process, and the touch conductive layer 102 of each of the touch units 10 and the pixel definition layer or the wiring layer of the sub-pixels 20 are arranged in the same layer. Thus, the touch units 10 are embedded within the sub-pixels 20 of the mini LED touch panel by adopting a minimum manufacturing process, thereby forming a mini LED-based embedded touch panel to improve integration and combination of the mini LED touch panel.

It can be understood that, for those of ordinary skill in the art, equivalent replacements or changes can be made according to the technical solutions of the present disclosure and its inventive concept, and all these changes or replacements shall fall within the protection scope of the appended claims of the present disclosure.

What is claimed is:

1. A mini light-emitting diode (LED) touch panel, comprising: a plurality of touch units distributed in an array manner, a plurality of touch addressing lines arranged in a first direction, and a plurality of touch reading lines arranged in a second direction, wherein the first direction and the second direction are perpendicular to each other;
wherein each of the touch units comprises a switching transistor and a touch conductive layer, the touch conductive layer is made of indium tin oxide material, and the touch conductive layer is distributed within gaps between a plurality of corresponding sub-pixels and extends into the corresponding sub-pixels; wherein a gate of the switching transistor is connected to a respective one of the touch addressing lines, a source of the switching transistor is connected to the touch conductive layer, and a drain of the switching transistor is connected to a respective one of the touch reading lines;
wherein each of the sub-pixels comprises a driving transistor and a mini LED lamp bead connected to each other, and the driving transistor of the sub-pixel is connected to the mini LED lamp bead via the touch conductive layer; and
wherein the switching transistor and the touch conductive layer in each of the touch units are configured such that based on the switching transistors, under the control of the touch addressing lines, electric charges accumulated in the touch reading lines, and
based on a variation of the electric charges, a capacitance change in the corresponding sub-pixels is sensed.

2. The mini LED touch panel as claimed in claim 1, further comprising: a plurality of scan lines arranged in the first direction, and a plurality of data lines arranged in the second direction;
wherein a gate of the driving transistor is connected to one of the scan lines, a source of the driving transistor is connected to one of the data lines, and a drain of the driving transistor is connected to the mini LED lamp bead via the touch conductive layer.

3. The mini LED touch panel as claimed in claim 1, wherein the touch conductive layer is a self-capacitance conductive layer, and the touch conductive layer is grounded.

4. The mini LED touch panel as claimed in claim 1, further comprising:
a touch-point coordinates acquisition unit, wherein the touch-point coordinates acquisition unit is connected to one of the touch reading lines, and the touch-point coordinates acquisition unit is configured to amplify and read the electric charges accumulated in the touch conductive layer and to determine touching-point coordinates according to a variation in the electric charges.

5. A driving method for a mini light-emitting diode (LED) touch panel, wherein the mini LED touch panel comprises:
a plurality of touch units distributed in an array manner, a plurality of touch addressing lines arranged in a first direction, and a plurality of touch reading lines arranged in a second direction, the first direction and the second direction being perpendicular to each other,
wherein each of the touch units comprises a switching transistor and a touch conductive layer, the touch conductive layer is made of indium tin oxide material, and the touch conductive layer is distributed within gaps between a plurality of corresponding sub-pixels and extends into the corresponding sub-pixels,
a gate of the switching transistor is connected to a respective one of the touch addressing lines, a source of the switching transistor is connected to the touch conductive layer, and a drain of the switching transistor is connected to a respective one of the touch reading lines,
each of the sub-pixels comprises a driving transistor and a mini LED lamp bead connected to each other, and the driving transistor of the sub-pixel is connected to the mini LED lamp bead via the touch conductive layer, and
wherein based on the switching transistors, under the control of the touch addressing lines, electric charges accumulated in the touch conductive layer are extracted via the touch reading lines, and
based on a variation of the electric charges, a capacitance change in the corresponding sub-pixels is sensed;
wherein the driving method comprises:
during displaying an image, turning on the driving transistor of each of the sub-pixels via one of the scan lines, and inputting a data signal to the mini LED lamp bead via one of the data lines; and
during touch scanning, turning on the switching transistor of each of the touch units via one of the touch addressing lines, and transferring the electric charges accumulated in the touch conductive layer via one of the touch reading lines.

6. The driving method for the mini LED touch panel as claimed in claim 5, wherein after transferring the electric charges accumulated in the touch conductive layer via one of the touch reading lines, the driving method further comprises:
amplifying and reading, by a touch-point coordinates acquisition unit, the electric charges accumulated on the touch conductive layer, and determining touching-point coordinates according to a variation in the electric charges.

7. The driving method for the mini LED touch panel as claimed in claim 5, wherein an image display stage and a touch scan stage are performed in a time-sharing manner in time of each frame.

8. The driving method for the mini LED touch panel as claimed in claim 5, wherein the touch conductive layer is a self-capacitance conductive layer, and the touch conductive layer is grounded.

* * * * *